Jan. 7, 1936.  S. FAITH ET AL  2,026,779
AUTOMOBILE ACCESSORY
Filed May 9, 1935
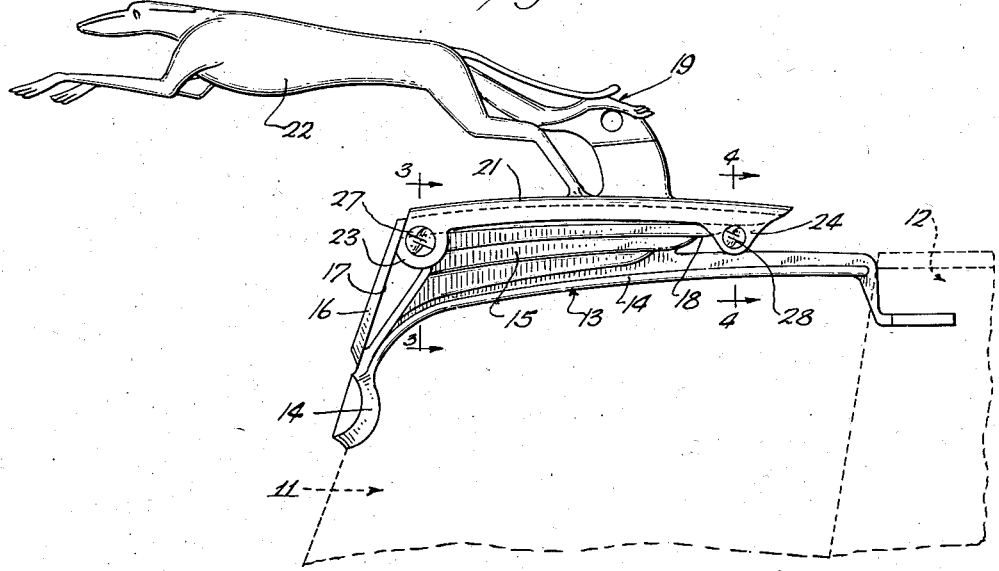
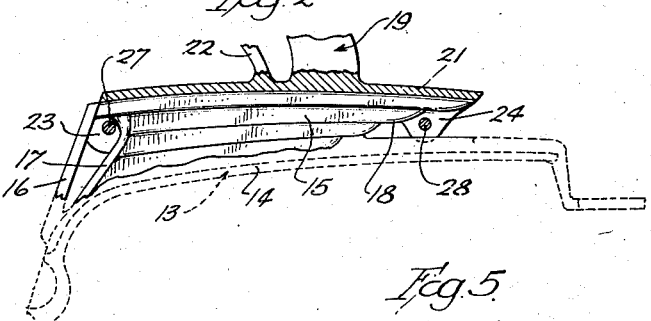
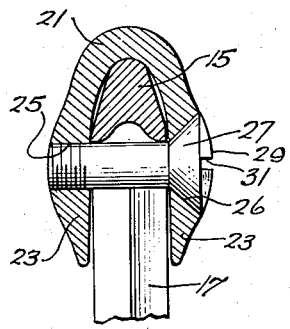
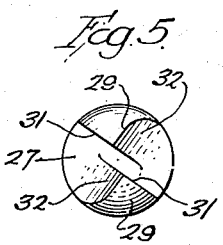
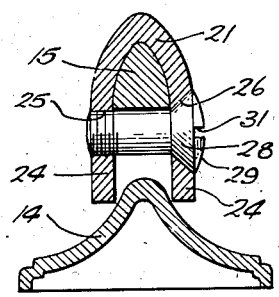
Inventors:
Stephen Faith
and
Samuel Klasstorner
Charles B. Rasmussen
Atty.

Patented Jan. 7, 1936

2,026,779

UNITED STATES PATENT OFFICE 2,026,779

AUTOMOBILE ACCESSORY

Stephen Faith and Samuel Klasstorner, Chicago, Ill., assignors to Faith Mfg. Co., Chicago, Ill., a corporation of Illinois Application May 9, 1935, Serial No. 20,580

1 Claim. (Cl. 248—205)

This invention relates in general to automobile accessories and more particularly to a distinctive ornament or decorative accessory adapted to be readily attached to the existing ornament provided on the radiator shell of a well-known make of car.

A principal object of the invention is the provision of a distinctive ornament which may be quickly and easily attached to the common or standard ornament with which the radiator shell of the automobile is equipped, using the standard ornament as a base or support therefor, which is peculiarly adapted to fit over the particular standard ornament, and is so secured thereto as to prevent ready detachment thereof.

Numerous other objects and advantages of the invention will be apparent as it is better understood from the following description, which, taken in connection with the accompanying drawing, discloses a preferred embodiment thereof.

In the drawing,

Figure 1 is a side elevational view of an ornament embodying the invention, showing it secured in place on a standard ornament;

Fig. 2 is a view similar to Fig. 1 with parts broken away and partly in section;

Fig. 3 is an enlarged vertical sectional view taken substantially on the line 3—3 of Fig. 1;

Fig. 4 is an enlarged sectional view taken substantially on the line 4—4 of Fig. 1; and Fig. 5 is an enlarged elevation of the head of one of the locking screws.

Referring to the drawing, reference characters 11 and 12 indicate the outlines of the radiator shell and hood, respectively, of an automobile of well-known make, the former being surmounted by a standard ornament, indicated generally by reference numeral 13, which is secured to the automobile in the usual manner. This particular standard ornament 13 has a base portion 14 and an upper wing-like portion 15, and a letter-numeral monogram 16 formed integral therewith to form a laterally extending aperture 17 adjacent the front end and an irregular slot or recess 18 at the rear end thereof.

A distinctive supplemental ornament 19 constitutes the instant invention, and it comprises a base portion 21 adapted to support and be formed integrally with the ornament proper 22, which in the preferred embodiment illustrated is in the form of a running greyhound, it being understood that any other distinctive form of ornament may be used. The supplemental ornament 19 preferably comprises a steel die-casting, but may be made in any desired manner and of any suitable material.

The base portion 21 is of a substantially U-shaped cross section throughout its length, decreasing somewhat in width from front to rear, and is slightly curved longitudinally so that it will fit snugly over the upper part of the wing-like portion 15 of the standard ornament 13. At the front and rear, respectively, each of the side portions of the base 21 is provided with integral, depending ears 23 and 24. The ears 23 and 24 on one side of the base 21 are each provided with threaded apertures or holes 25 which are co-axial, respectively, with countersunk apertures 26 in each of the transversely opposite ears.

The co-axial apertures 25, 26 in the front pair of ears 23 are so located that when the supplemental ornament 19 is properly positioned on the standard ornament 13, a retaining screw 27 threaded therethrough (Figs. 2 and 3) will substantially contact the upper rearward wall of the aperture 17 as defined by the wing-like portion 15 of the standard ornament 13. Similarly, (Figs. 2 and 4) the apertures 25, 26 in the rear pair of ears 24 are so located when the supplemental ornament is in assembled position that a retaining screw 28 engaging said apertures will substantially contact one of the irregular surfaces on the rear of the wing-like portion 15 which defines in part the slot 18.

Upon tightening the screws 27 and 28, each of the two pairs of ears 23, 24 will also be squeezed together to firmly embrace the adjacent portion of the wing-like portion 15 of the standard ornament 13. It will therefore be readily apparent that when so positioned, the base portion 21 of the supplemental ornament 19 will be rigidly mounted on the standard ornament 13 as a supporting structure, and will be immovable relatively thereto in any direction.

The two retaining screws 27 and 28 are shown in Fig. 1 as being of different diameters, but their dimensions as well as the positions of the apertures receiving them are determined by the shape of the standard ornament to be used as a base or mounting support.

In order to insure against ready detachment of the supplemental ornament 19 to prevent theft, the heads of the retaining screws 27 and 28 are so shaped (Figs. 3, 4 and 5) that the screws may be threaded into but not out of the apertures 25.

Two raised portions 29 are provided on the outer face of the head of each screw, each of which has a vertical inner wall 31, the two walls 31 forming a slot for a screw driver, and each wall terminating adjacent the center of the face. The surface 32 of each of the raised portions 29 adjacent the inner end of the vertical wall 31 is sloped downwardly into the plane of the bottom of the slot defined by the walls 31. It will thus be seen that if a screw driver is inserted in this slot and turned in one direction, (clockwise in Fig. 5) it will rotate the screw; but if it is turned in the opposite direction, it cannot turn the screw since there is no purchasing surface therefor and it will merely ride upwards on the curved surfaces 32.

It is thought that the invention and many of its attendant advantages will be understood from the foregoing description, and it will be understood that various changes may be made in the form, construction and arrangement of the parts without departing from the spirit and scope of the invention or sacrificing all of its material advantages, the form hereinbefore described being merely a preferred embodiment thereof.

We claim:

In association with a standard ornament for an automobile, a supplemental ornament adapted to be mounted upon said standard ornament, comprising an upper portion in the form of a desired ornament, a base portion integral with said upper portion, said base portion having a substantially U-shaped transverse cross-section to enable it to fit over and conform to the upper part of said standard ornament, and means cooperating with said base portion and said standard ornament to secure said supplemental ornament on said standard ornament.

STEPHEN FAITH.
SAMUEL KLASSTORNER.